J. NASON & J. F. WILSON.
Assignors to J. E. GOLDSWORTHY
Gate.
No. 8,456. Reissued Oct. 15, 1878.
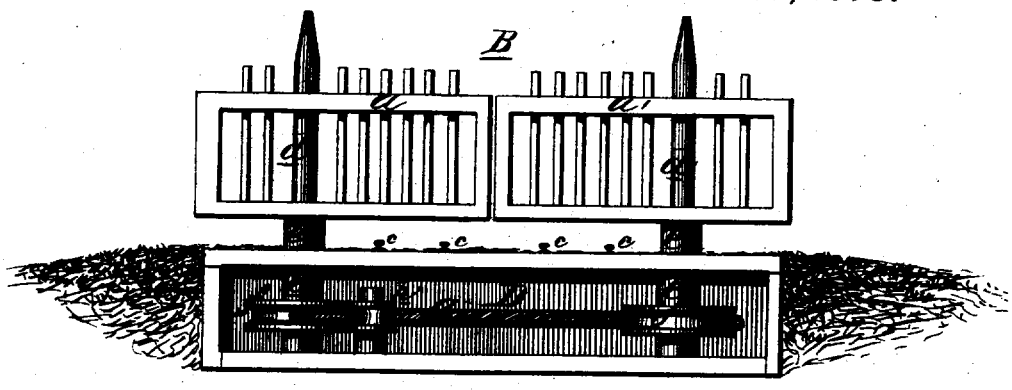
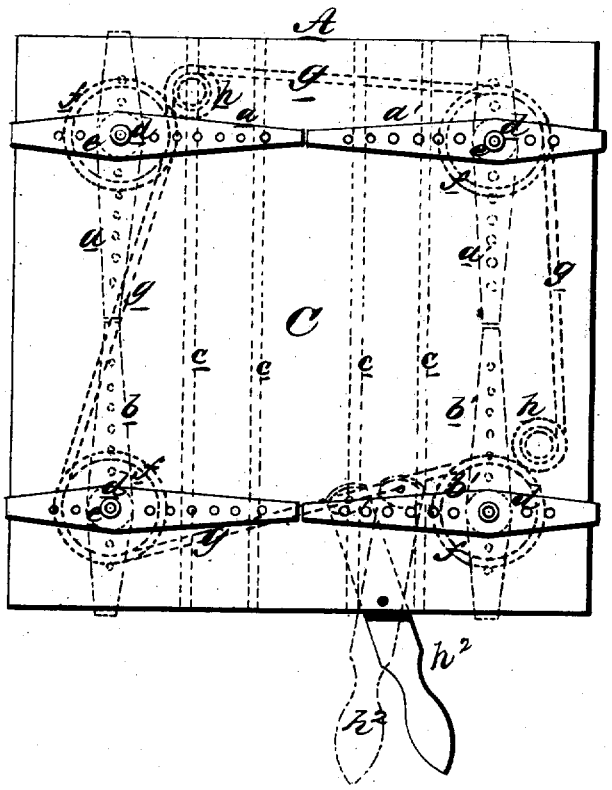
WITNESSES.
Henry B. Carpenter
E. J. Carpenter
INVENTORS.
Joseph Nason
Joseph F. Wilson by
J. E. Goldsworthy atty
N. PETERS, PHOTO-LITHOGRAPHER, WASHINGTON, D. C.

UNITED STATES PATENT OFFICE.

JOSEPH NASON, OF BANGOR, MAINE, AND JOSEPH F. WILSON, OF BOSTON, MASSACHUSETTS, ASSIGNORS TO JOHN E. GOLDSWORTHY.

IMPROVEMENT IN GATES.

Specification forming part of Letters Patent No. 68,306, dated August 27, 1867; Reissue No. 8,456, dated October 15, 1878; application filed June 12, 1878.

*To all whom it may concern:*

Be it known that we, JOSEPH NASON, of the city of Bangor and State of Maine, formerly of Boston, State of Massachusetts, and JOSEPH F. WILSON, of the city of Boston and State of Massachusetts, have invented new and useful Improvements in Gates; and we do hereby declare that the following, taken in connection with the drawings which accompany and form part of this specification, is a description of our invention sufficient to enable those skilled in the art to practice it.

In opening and closing the gates where railways cross highways at grade the means that have heretofore been employed to operate them are expensive, and generally require attention and laborious manipulation by several gatemen.

Our invention is designed to remedy these difficulties, in the carrying out of which, as hereinafter represented, we mount the several gates on tubular shafts, through each of which and the gate a stationary post runs, the shafts extending below the trackway, and having at or near the lower end of each a pulley or wheel, around which a rope or chain passes in such manner as to bring the several shafts into a train operated by said rope, so that by opening or closing either gate the others will be thereby simultaneously opened or closed, or by operating a lever connected with the chain or rope all the gates shall be operated together.

Our invention therefore mainly consists in combining with a railway-track at a road-crossing gates arranged on opposite sides of the track and of the crossing, and the novel arrangement of the interconnecting mechanism employed for simultaneously opening or closing them, as hereinafter more fully described.

The drawings represent a set of gates connected and operated in accordance with our invention, A showing a plan, and B a cross-section between the gates.

Similar letters of reference indicate corresponding parts.

*a a′ b b′* denote two sets or pairs of gates, one pair being upon one and the other upon the opposite side of the street-crossing C, and show their position across the railway-track when the street or roadway is open. The position of the said gates when used to close the street-crossing is shown in the dotted lines *a a′ b b′*. Each gate swings on a stationary vertical post, *d*, and is fixed upon the top of a sleeve or tubular shaft, *e*, through which the post extend, said shaft extending below the track or road bed, and having fixed upon its lower end a pulley or wheel, *f*, the several wheels being connected or made into a train by a band, rope, or chain, *g*, engaging with each, as seen at A, guide-pulleys *h* being used, if desirable, to force the band into contact with the wheels or pulleys *f*. At any convenient point the rope or chain *g* is attached to one end of a lever, $h^2$, whose opposite end is so located as to be within reach of the gateman, so that by swinging the lever in one or the other direction he actuates the chain and simultaneously opens all or closes all the gates. The same result may, however, be obtained by swinging either one of the gates, this operation correspondingly swinging all the others.

In most cases a chain and chain-pulley may preferably be used, instead of a rope and plain-grooved pulleys, to connect and operate the gates, the teeth of the pulleys working into the links of the chain and insuring proper relative movement of all the gates.

Instead of having the tubular shafts or sleeves *e* to rotate on the posts *d*, these sleeves may be made stationary and the pulleys and gates be fixed upon the posts; but we prefer the arrangement substantially as shown as most conducive to strength and ease of operation.

The pulleys *f* and connecting apparatus *g*, being arranged in the box D below the track, are protected from the injurious effects of open exposure to the weather, and may be kept in much better operating condition than where high posts are used with pulleys and overhung connections from post to post to operate the gates.

We do not claim the simultaneous operation of gates as a distinctive feature of our invention; but

We claim as new and desire to secure by Letters Patent—

1. The combination, with gates arranged in opposite sides of a railroad-track at a street-crossing, of flexible connections—such as a chain or band—engaging wheels or pulleys secured to the shafts on which the gates are mounted, whereby the gates may be simultaneously opened or closed, substantially as specified.

2. The combination, with two pairs of gates arranged on opposite sides of a railway-track at a street-crossing, of flexible connections, such as a chain or band, engaging with wheels or pulleys secured to the shafts on which the gates are mounted, for simultaneously opening or closing them, substantially as specified.

3. The combination, with two pairs of gates arranged on opposite sides of a railway-track at a street-crossing, of flexible connections, such as a band or chain, engaging wheels or pulleys secured to the shafts on which the gates are mounted, and boxes, troughs, or closed receptacles below the surface of the crossing and track, adapted to incase and protect the operating mechanism of the gates, substantially as specified.

4. The combination, with a set of gates mounted on tubular shafts, of wheels rigidly secured to said shafts, so as to turn with the gates, and all of said wheels connected with a chain or band, so that motion may be transmitted from one gate to the other and all the gates simultaneously opened or closed, substantially as set forth.

JOSEPH NASON.
JOSEPH F. WILSON.

Witnesses to Nason's signature:
CHARLES P. CHURCH,
H. M. PLAISTED.

Witnesses to Wilson's signature:
CHARLES H. WILSON,
CHAS. H. MORGAN.